United States Patent [19]

Shimp et al.

[11] 4,394,396
[45] Jul. 19, 1983

[54] SHRIMP PROCESSING

[75] Inventors: Lawrence A. Shimp, Robbinsville, N.J.; John E. Steinhauer, Malvern, Pa.

[73] Assignee: FMC Corporation, Philadelphia, Pa.

[21] Appl. No.: 309,873

[22] Filed: Oct. 9, 1981

[51] Int. Cl.$^3$ ............................................. A23L 1/325
[52] U.S. Cl. ..................................... 426/332; 426/643
[58] Field of Search ....................... 426/643, 331, 332

[56] References Cited

U.S. PATENT DOCUMENTS

| | | | |
|---|---|---|---|
| 2,488,184 | 11/1949 | Garnatz | 99/111 |
| 2,555,236 | 5/1951 | Kreidl et al. | 99/188 |
| 2,735,777 | 2/1956 | Meyer | 99/111 |
| 3,036,923 | 5/1962 | Mahon | 99/195 |
| 4,060,642 | 11/1977 | Suzuki | 426/104 |
| 4,075,357 | 2/1978 | Szczesniak et al. | 426/332 |
| 4,076,850 | 2/1978 | Nickerson et al. | 426/332 |
| 4,092,435 | 5/1978 | Teijeiro | 426/296 |
| 4,221,819 | 9/1980 | Falci et al. | 426/262 |

Primary Examiner—Marc L. Caroff
Attorney, Agent, or Firm—Frank Ianno; Eugene G. Seems

[57] ABSTRACT

A process for treating shrimp is described that results in their having desirable moisture retention after cooking or freezing, while retaining their natural appearance, by contacting them with a mixture of sodium tripolyphosphate and sodium acid pyrophosphate salts in water, wherein the salts have a weight ratio of 80:20 to 60:40 and the mixture yields a pH in water of about 6.2 to about 7.1; optionally up to 7 wt % of ordinary salt can also be employed in the aqueous mixture of phosphate salts.

6 Claims, No Drawings

SHRIMP PROCESSING

When shrimp are commercially processed they are subjected to a treating step prior to being frozen or cooked, to assure that excess amounts of water are not subsequently lost. Untreated shrimp lose excess amounts of water during subsequent cooking operations and therefore have very poor yields. This results from shrinkage when cooking either fresh shrimp or frozen and subsequently thawed shrimp. In order to minimize this moisture loss in shrimp, commercial processors have employed phosphate salts, principally sodium tripolyphosphate, either alone or in combination with ordinary salt, to treat the shrimp. This is normally done by soaking the shrimp in a solution of phosphate salt for a given period prior to cooking or freezing.

While the above described treating solutions are effective in increasing the moisture retention of the processed shrimp, the quality of the treated shrimp as judged by its appearance and texture, often decreases because of the gelation of shrimp proteins in the outer layer of shrimp. This causes a visible change in the shrimp as evidenced by a translucency, slimy surface or rubbery texture of the shrimp after processing that results in an unappetizing product. This problem is well known in the art as evidenced by U.S. Pat. No. 4,221,819 issued on Sept. 9, 1980 in which this is attempted to be minimized by treating the shrimp with calcium and/or magnesium salts in solution. The salts are added as a component of the phosphate solution used to treat the shrimp, or they may be added to a separate aqueous solution for further treatment of the shrimp after a phosphate treatment.

In accordance with the present invention, it has been found that shrimp can be processed so that they will have desirable moisture retention after cooking or frozen storage, while retaining their natural appearance after processing, by contacting the shrimp with a phosphate salt mixture of sodium tripolyphosphate and sodium acid pyrophosphate in water, wherein the salts are present in a weight ratio of 80:20 to 60:40, yield a pH in water of about 6.2 to about 7.1, and have a concentration of 0.5 wt % to saturation. Optionally, up to 7 wt % of ordinary salt can be employed in solution with the phosphate salt mixture.

In carrying out the present invention, a mixture of ($Na_5P_3O_{10}$) sodium tripolyphosphate (STPP) and ($Na_2H_2P_2O_7$) sodium acid pyrophosphate (SAPP) having a weight ratio of from 80:20 to 60:40 is added to water or a sodium chloride solution. The concentration of the phosphate salt mixture can range anywhere from 0.5% up to saturation and the sodium chloride can range from 0 to 7% by weight. When the phosphate salt mixture is employed in these ratios, the pH of the resulting solution is from about 6.2 to about 7.1.

The shrimp that are to be treated are normally first peeled and deveined and soaked in the above solution for a period of between 5 minutes and 24 hours. Thereafter, the treated shrimp are either cooked or frozen for later cooking.

The preferred conditions for treating shrimp according to the present invention comprise the preparation of a solution of a phosphate salt mixture of STPP and SAPP in a weight ratio of 75:25 to 65:35 wherein the phosphate salt mixture is present in a concentration of about 5 to 7% in water; the solution optionally contains from 1 to 2% of sodium chloride. The shrimp to be treated are soaked in this solution for a period of one to two hours before being cooked or frozen for later cooking.

When this process is carried out with the aforesaid mixture of phosphate salts, the resultant treated shrimp, after being cooked, yield a product whose desirable properties cannot be obtained by the use of either phosphate salt when used alone. Specifically, the resulting shrimp, after cooking, show excellent water retention as measured by the yield and also retain the desirable natural appearance of the shrimp without any translucency or shriveled appearance which detract from the acceptability of the processed shrimp.

More specifically, if only sodium tripolyphosphate alone is employed, the yield is somewhat higher than with the phosphate salt mixture of the present invention but the appearance of the shrimp is decidedly inferior to the natural product produced by the present mixture. In similar fashion, if sodium acid pyrophosphate is used alone, the yield is quite low and the product is shriveled and otherwise not acceptable in the market place.

The effect of various treating solutions on the moisture retention in shrimp is evaluated by measuring the weight of the shrimp before any treatment and then weighing them again after each processing step, namely, soaking in the treatment solution, thawing after frozen storage, and cooking, and then comparing the weights after processing with the original weight to obtain the percent yield after each step. Before each weight is taken, the shrimp are drained on a wire screen for 2 minutes to eliminate the effect of free water. The appearance and texture evaluation of the shrimp is relative, based on visual comparison with controlled shrimp that have gone through all the same steps of the treated shrimp except that they were soaked in water and not a phosphate solution.

The following examples are given to illustrate the invention and are not deemed to be limiting thereof.

EXAMPLE I

The STPP/SAPP phosphate dip solutions were made up using STPP/SAPP weight ratios 100/0, 80/20, 75/25, 70/30, 65/35, 60/40, 50/50 and 0/100. The total phosphate concentration in each solution was 5.6 wt %, the NaCl concentration was 1.4%. This was done by dissolving 84 grams of each phosphate mixture in 1395 g water containing 21 g of salt. For comparison, a solution was also made up of a commercial product, Olin Blend 6 (covered in U.S. Pat. No. 4,221,819) which contained about 22% salt, 2% $CaCl_2$, 45% STPP and 31% MSP (sodium dihydrogen phosphate). One hundred five grams of this blend in 1395 g water gave a solution containing about 5.5 wt % phosphate, 1.4 wt % salt and 0.1 wt % $CaCl_2$. The pH of each solution was measured both before and after addition of the shrimp. Exactly 350 g of fresh, 30 count peeled and deveined shrimp was soaked in each solution at 20° C. for one hour. The shrimp were then drained for 2 minutes, weighed and put into a $-4°$ C. freezer. After 6 days the shrimp were thawed on a wire mesh screen, weighed, cooked in boiling water for 4 minutes, drained for 2 minutes and weighed again. Yields after each step were calculated based on the starting weight. Appearance was characterized by comparison with the water treated (control) shrimp after each step. The results are shown in Table I. Satisfactory appearance and good moisture retention were obtained with phosphate blends having an STPP/SAPP weight ratio of between 80/20 and 60/40.

EXAMPLE II

The STPP/SAPP phosphate dip solutions contained STPP and SAPP in the weight ratios 100/0, 80/20, 70/30 and 65/35. One hundred grams of each phosphate mixture was dissolved in 1500 g of water containing 25 g of salt to give a phosphate concentration of 6.2% and a salt concentration of 1.5%. One hundred twenty-five grams of the Olin Blend 6 product was dissolved in water to give a solution containing about 5.9% phosphate, 1.7% salt and 0.1% $CaCl_2$. About 450 g of 300 count Indian shrimp were soaked in the phosphate solutions for one hour at 20° C., drained for two minutes, weighed, cooked in boiling water for five minutes, drained for two minutes and reweighed. Yields were calculated for each step, and appearance was evaluated by comparison with the water treated (control) shrimp. The results are shown in Table II. Acceptable appearance was obtained with good moisture retention after cooking for all the phosphate blends.

TABLE I

| Treatment Solution | pH of Treatment Solution | Percent Yield | | | Appearance Comments |
| --- | --- | --- | --- | --- | --- |
| | | After Dip | After Thaw | After Cooking | (After cooking) |
| (All except control have 5.6% phosphate and 1.4% salt) | | | | | |
| STPP | 8.95 | 111.6 | 104.9 | 96.1 | Translucent |
| STPP/SAPP 80/20 | 7.13 | 110.8 | 104.3 | 92.4 | Somewhat translucent |
| STPP/SAPP 75/25 | 6.94 | 109.8 | 103.4 | 94.2 | Excellent |
| STPP/SAPP 70/30 | 6.74 | 109.8 | 102.8 | 90.8 | Good |
| STPP/SAPP 65/35 | 6.50 | 109.5 | 101.9 | 90.1 | Somewhat dry, but acceptable |
| STPP/SAPP 60/40 | 6.28 | 109.2 | 100.7 | 88.9 | Good |
| STPP/SAPP 50/50 | 5.88 | 108.2 | 99.6 | 84.6 | White, somewhat shriveled |
| SAPP | 4.13 | 93.8 | 78.3 | 47.5 | White, shriveled |
| Water (control) | 6.23 | 108.4 | 87.7 | 74.8 | White, dry |
| Olin Blend 6 | 6.45 | 110.5 | 107.9 | 87.6 | Good |

TABLE II

| Treatment Solution | pH of Treatment Solution | Percent Yield | | Appearance Comments (After cooking) |
| --- | --- | --- | --- | --- |
| | | After Dip | After Cooking | |
| (All except control have 6.2% phosphate and 1.5% salt) | | | | |
| STPP | 8.47 | 126 | 106 | Translucent |
| STPP/SAPP 75/25 | 6.83 | 130 | 94 | Somewhat translucent |
| STPP/SAPP 70/30 | 6.75 | 130 | 91 | Good |
| STPP/SAPP 65/35 | 6.42 | 129 | 89 | Good |
| Water (Control) | 6.23 | 121 | 69 | Good |
| Olin Blend 6 | 6.28 | 129 | 80 | Good |

We claim:

1. A process for inhibiting the loss of moisture of raw shrimp on thawing or cooking while retaining their natural appearance after processing comprising contacting the shrimp with an aqueous solution of a phosphate salt mixture of sodium tripolyphosphate and sodium acid pyrophosphate, said salts being present in a weight ratio of 80:20 to 60:40, the pH of said solution being about 6.2 to 7.1, the concentration of said salt mixture in the solution being 0.5 wt % to saturation.

2. Process of claim 1 wherein the shrimp are contacted with said salt mixture for from 5 minutes to 24 hours prior to being cooked or frozen.

3. Process of claim 1 wherein the phosphate salt mixture in water also contains up to 7 wt % of sodium chloride.

4. Process of claim 1 wherein said phosphate salt mixture has a sodium tripolyphosphate to sodium acisd pyrophosphate weight ratio of 75:25 to 65:35, and is present in water in a concentration of about 5 to about 7% by weight.

5. Process of claim 4 wherein the shrimp are treated in said sodium phosphate salt mixture for from about one to about two hours before being cooked or frozen.

6. Process of claim 4 wherein the phosphate salt mixture in water also contains from about 1 to 2 wt % of sodium chloride.

* * * * *